(No Model.)
W. A. LOUD.
TRACTION WHEEL.
No. 346,410. Patented July 27, 1886.
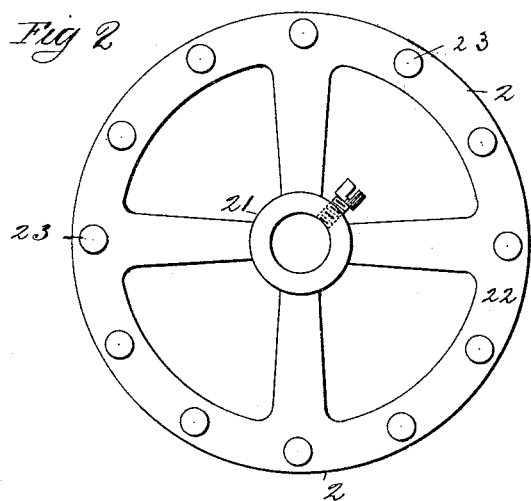
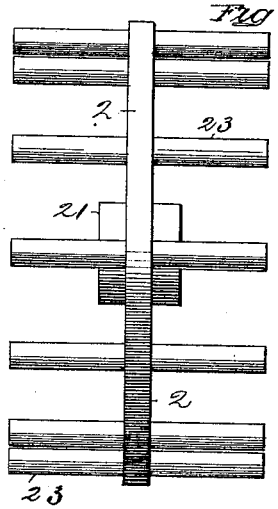
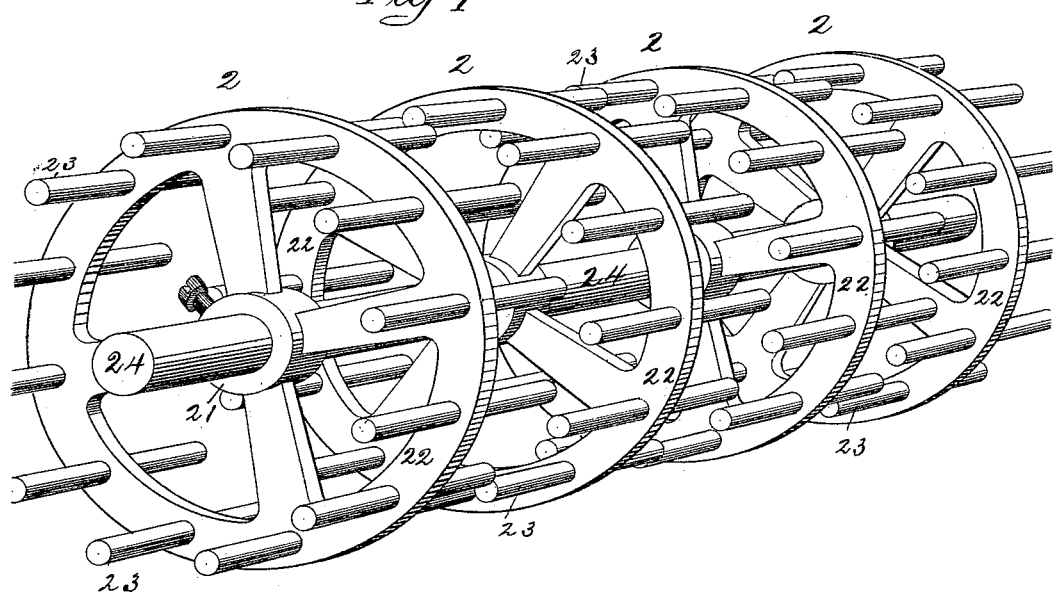
WITNESSES:
Wm H Chapin
G. M. Chamberlain.
INVENTOR
Waldo A Loud
BY Chapin & Co
ATTORNEYS
N. PETERS, Photo-Lithographer, Washington, D. C.

UNITED STATES PATENT OFFICE.

WALDO A. LOUD, OF SPRINGFIELD, MASSACHUSETTS.

TRACTION-WHEEL.

SPECIFICATION forming part of Letters Patent No. 346,410, dated July 27, 1886.

Application filed March 29, 1886. Serial No. 196,875. (No model.)

*To all whom it may concern:*

Be it known that I, WALDO A. LOUD, a citizen of the United States, residing at Springfield, in the county of Hampden and State of Massachusetts, have invented new and useful Improvements in Traction-Wheels, of which the following is a specification.

This invention relates to improvements in traction-wheels for vehicles, the object being to provide a wheel of this class of improved simplified construction; and the invention consists in the peculiar construction and arrangement of the parts of the wheel, as hereinafter fully described, and set forth in the claims.

In the drawings forming part of this specification, Figure 1 is a perspective view, Fig. 2 an end elevation, and Fig. 3 a side elevation, of a traction-wheel constructed according to my invention.

The improved traction-wheel herein shown and described may consist of a single wheel, 2, or of several of said wheels secured on a shaft side by side, as shown in Fig. 1, according to the service which the wheel is to perform—that is to say, whether the wheel is to be connected with the mechanism of a heavy machine, such as a harvester or similar device, for operating the mechanism thereof, or whether the wheel is to be connected with a lighter machine for operating the same, such as a lawn-mower, and, if employed to operate a machine of the latter class, in many instances the single wheel, hereinafter described, possesses sufficient traction-power for the operation thereof.

In the drawings, 21 is the hub of the wheel, from which several arms radiate and connect with a rim, 22, and the latter is provided with a series of bars, 23, projecting from one or both sides of the latter at right angles to the side of the wheel, as shown.

The above-described wheel is made, preferably, by casting it entire, with all of its said parts in one piece, of iron or other suitable metal, and it is made, preferably, with its rim, 22, united to the hub 21 by connecting-arms, as shown; but it may be made, if desired, with a continuous web between the hub and rim; also, said wheel may be constructed by casting a suitable wheel and securing the bars 23 in the rim or felly thereof in a transverse position relative to the latter, (shown in the drawings;) but the preferable construction is to cast said bars integral with the rim of the wheel and upon both sides of the latter.

In constructing a wheel for use on a heavy machine, as above described, several of the traction-wheels 2 are secured on a suitable shaft, 24, by set-screws or other suitable means, to construct a wheel of greater or less length, substantially such as is shown in Fig. 1. In said figure the wheels 2 are arranged in such relative positions on shaft 24 as bring the ends of the bars 23 between the ends of the bars on the adjoining wheel; but such relative arrangement may be varied so as to bring the ends of said bars opposite each other, if desired.

A traction-wheel constructed as herein described and shown, when rolling over the ground, presents a contact-surface which is peculiarly adapted to engage with the latter, consisting, as it does, of the comparatively narrow rim, 22, of the wheel and the transverse cross-bars 23.

What I claim as my invention is—

1. A traction-wheel consisting of a rim and a hub united one to the other, substantially as described, and a series of bars projecting from said rim at right angles to the side of the wheel, substantially as set forth.

2. A traction-wheel consisting of a rim and a hub united one to the other, substantially as described, and a series of bars projecting from the opposite sides thereof at right angles to the sides of the wheel, substantially as set forth.

3. A traction-wheel consisting of several separate wheels secured on a shaft side by side, each of which separate wheels consists of a rim and a hub united one to the other, substantially as described, and a series of bars projecting from one or both sides of the latter at right angles to the side of the wheel, substantially as set forth.

WALDO A. LOUD.

Witnesses:
WM. H. CHAPIN,
G. M. CHAMBERLAIN.